(12) United States Patent
Makino et al.

(10) Patent No.: US 9,857,493 B2
(45) Date of Patent: Jan. 2, 2018

(54) METHOD FOR DETECTING POWDER AND POWDER DETECTION DEVICE

(71) Applicant: SINTOKOGIO, LTD., Nagoya-shi, Aichi (JP)

(72) Inventors: Hiroyasu Makino, Toyokawa (JP); Minoru Hirata, Toyokawa (JP); Shuji Takasu, Toyokawa (JP); Hiroyuki Miyazaki, Toyokawa (JP); Matthias Strehle, Freiberg (DE)

(73) Assignee: SINTOKOGIO, LTD., Nagoya-shi, Aichi (JP)

( * ) Notice: Subject to any disclaimer, the term of this patent is extended or adjusted under 35 U.S.C. 154(b) by 30 days.

(21) Appl. No.: 14/654,902

(22) PCT Filed: Aug. 5, 2013

(86) PCT No.: PCT/JP2013/071171
§ 371 (c)(1),
(2) Date: Jun. 23, 2015

(87) PCT Pub. No.: WO2014/103421
PCT Pub. Date: Jul. 3, 2014

(65) Prior Publication Data
US 2015/0346371 A1 Dec. 3, 2015

(30) Foreign Application Priority Data

Dec. 24, 2012 (JP) .................................. 2012-280392

(51) Int. Cl.
*G01V 3/02* (2006.01)
*B22C 9/02* (2006.01)
(Continued)

(52) U.S. Cl.
CPC .................. *G01V 3/02* (2013.01); *B22C 9/02* (2013.01); *B22C 15/02* (2013.01); *B22C 19/00* (2013.01); *B22C 19/04* (2013.01); *G01F 23/242* (2013.01)

(58) Field of Classification Search
None
See application file for complete search history.

(56) References Cited

U.S. PATENT DOCUMENTS 3,397,715 A * 8/1968 Fathauer ................ D06F 39/087
137/387
4,412,450 A * 11/1983 Franz .................... G01F 23/266
73/304 C
(Continued)

FOREIGN PATENT DOCUMENTS

JP S61-135225 U 8/1986
JP H4-33442 U 3/1992
(Continued)

OTHER PUBLICATIONS

English-language translation of International Preliminary Report on Patentability (IPRP) dated Jul. 9, 2015 that issued in WO Patent Application No. PCT/JP2013/071171.

*Primary Examiner* — Jermele M Hollington
*Assistant Examiner* — Suresh K Rajaputra
(74) *Attorney, Agent, or Firm* — Drinker Biddle & Reath LLP

(57) ABSTRACT

A method for detecting powder is performed in a powder detection device including a pair of electrodes arranged to be opposed to each other with a gap interposed therebetween and an electric circuit electrically connected to the pair of electrodes. The method includes detecting powder filling in
(Continued)

a case where the electric circuit together with powder and the electrodes forms a closed circuit when the powder fills the gap.

16 Claims, 5 Drawing Sheets

(51) Int. Cl.
*B22C 19/00* (2006.01)
*G01F 23/24* (2006.01)
*B22C 19/04* (2006.01)
*B22C 15/02* (2006.01)

(56) References Cited

U.S. PATENT DOCUMENTS

| | | | | |
|---|---|---|---|---|
| 4,833,393 | A * | 5/1989 | Wetzel | G01R 27/2605 |
| | | | | 324/678 |
| 5,223,796 | A * | 6/1993 | Waldman | G01R 27/2676 |
| | | | | 324/687 |
| 5,898,309 | A * | 4/1999 | Becker | G01N 27/221 |
| | | | | 324/664 |
| 5,900,736 | A * | 5/1999 | Sovik | G01N 9/24 |
| | | | | 324/663 |
| 2004/0000388 | A1 * | 1/2004 | Faraldi | B22C 19/04 |
| | | | | 164/456 |
| 2007/0000320 | A1 * | 1/2007 | Jaeger | G01F 23/266 |
| | | | | 73/304 C |
| 2012/0074964 | A1 * | 3/2012 | Abdelrahman | B22C 19/04 |
| | | | | 324/686 |

FOREIGN PATENT DOCUMENTS

| | | |
|---|---|---|
| JP | H06-502256 A | 3/1994 |
| JP | 2774871 B2 | 7/1998 |
| JP | H10-202344 A | 8/1998 |
| JP | 2000-153339 A | 6/2000 |
| JP | 3075814 B2 | 8/2000 |
| JP | 2001-321928 A | 11/2001 |
| JP | 2004-025300 A | 1/2004 |

* cited by examiner

METHOD FOR DETECTING POWDER AND POWDER DETECTION DEVICE

TECHNICAL FIELD

The present invention relates to a method for detecting powder and a powder detection device for electrically detecting powder.

BACKGROUND ART

Sand mold casting is a technique of making a sand mold by compacting powder such as green sand, and forming a casting using this sand mold. In making the sand mold, it is extremely important to check the presence or absence of powder in the powder filling process in order to stably make sand molds and reduce defects.

The green sand molding method in sand mold casting includes, for example, a sand filling process, that is, aeration by which green sand is blown in with compressed air, gravity filling, or blow by which sand is blown in to fill, and a subsequent process of compressing the filling green sand by mechanical squeeze. Green sand molds are made through these combined processes.

For example, when castings with a complex shape, such as engines, are to be obtained, the shape of the sand mold having the inverted shape of the casting is also complicated accordingly, and the filling of the complex-shaped part with green sand may be insufficient. In this case, sufficient sand mold strength may not be obtained by subsequent squeeze.

Since such defects in making a sand mold (for example, Patent Literature 1) cause casting defects, it is desired to prevent filling defects of casting molds in the previous process. For this purpose, simulation of molding sand filling defects (for example, Patent Literature 2) has been carried out, but in practice, no checking method by electrical means has been developed heretofore.

CITATION LIST

Patent Literature

[Patent Literature 1] Japanese Patent Application Laid-Open Publication No. 2001-321928
[Patent Literature 2] Japanese Patent Application Laid-Open Publication No. 10-202344

SUMMARY OF INVENTION

Technical Problem

It is therefore requested to enable determination of powder-filling defects by electrically instantaneously detecting the presence or absence of powder.

Solution to Problem

In order to solve the above-mentioned problem, a method for detecting powder according to an aspect of the present invention using a powder detection device including a pair of electrodes arranged to be opposed to each other with a gap interposed therebetween and an electric circuit electrically connected to the pair of electrodes includes, detecting powder filling in a case where the electric circuit together with powder and the pair of electrodes forms a closed circuit when the powder fills the gap.

In the method for detecting powder according to an aspect of the present invention, powder-filling defects can be detected by electrically instantaneously detecting the powder filling between the pair of electrodes as described above.

In the method for detecting powder according to an embodiment, the electric circuit may include at least three transistor amplifiers connected in series. In the method for detecting powder according to an embodiment, the electrodes may be formed of elongated metal plates and have a length of 50 mm or less in the longitudinal direction of the electrodes. In the method for detecting powder according to an embodiment, the powder may be molding sand for use in sand mold casting.

A powder detection device according to an aspect of the present invention includes a pair of electrodes arranged to be opposed to each other with a gap interposed therebetween and an electric circuit electrically connected to the pair of electrodes. The powder detection device detects powder filling in a case where the electric circuit together with powder and the electrodes forms a closed circuit when the powder fills the gap.

In the powder detection device according to an embodiment, the electric circuit may have at least three transistor amplifiers connected in series. In the powder detection device according to an embodiment, the electrodes may be formed of elongated metal plates and have a length of 50 mm or less in the longitudinal direction of the electrodes. In the powder detection device according to an embodiment, the powder may be molding sand for use in sand mold casting.

Advantageous Effects of Invention

According to various aspects and various embodiments of the present invention, the gap between a pair of electrodes is filled with powder to bring the electric circuit into an energized state, so that the filling condition can be electrically detected. As a result, powder-filling defects can be determined.

DESCRIPTION OF EMBODIMENTS

A method for detecting powder and a powder detection device according to an embodiment to which the present invention is applied will be described below with reference to the figures.

Figure 1:
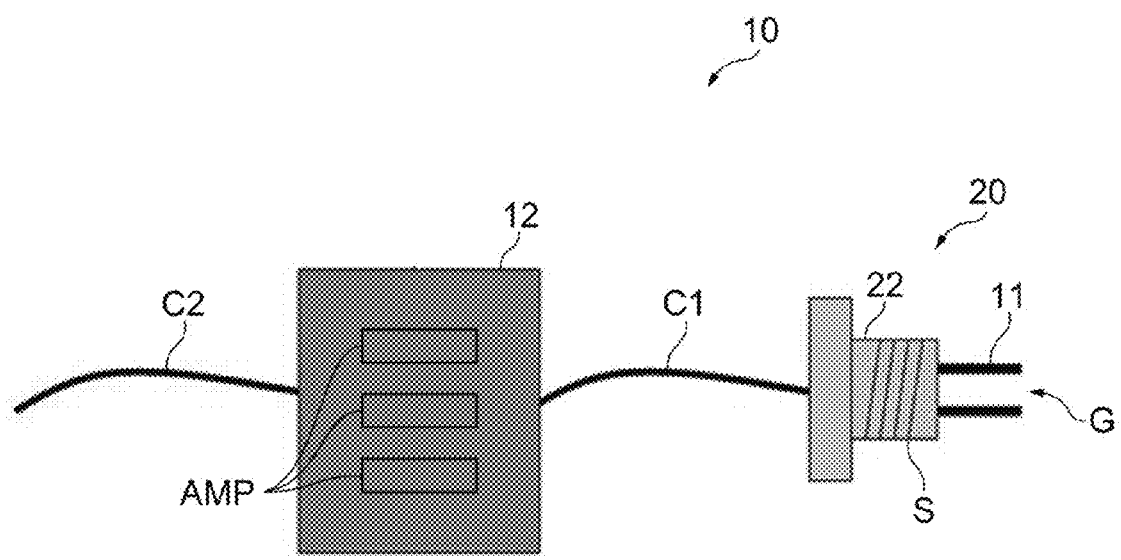
FIG. 1 is a schematic diagram of a device for detecting powder.

A powder detection device 10 shown in FIG. 1 includes an electrode unit 20 and an electric circuit 12. The electrode unit 20 includes two copper plates 11 arranged parallel to each other and an insulating base 22. The two copper plates 11 function as a pair of electrodes.

The copper plates 11 each are an elongated metal plate and may have a size of, for example, a thickness of 1 mm, a width of 7 mm, and a length (length in the longitudinal direction) of 50 mm or less. A pair of copper plates 11 are arranged to be opposed to each other with a predetermined distance (for example, 1 mm). A predetermined gap G is formed between the pair of copper plates 11. The copper plates 11 may have a thickness of 0.5 mm or more in order to ensure strength and may have a width of 1 mm or more in order to contact with a certain amount of sand grains. The width of the gap G between the copper plates 11 may be 0.5 mm or more in order to facilitate passage of sand grains and may be 50 mm or less in view of the sensitivity of the sensor. The copper plates 11 may be made of any material other than copper as long as the material has conductivity.

One ends of the pair of copper plates 11 are buried in the insulating base 22. The insulating base 22 is connected with a cable C1, and this cable C1 electrically connects the pair of copper plates 11 with the electric circuit 12. The insulating base 22 may have a thread groove S for mounting.

The electric circuit 12 may include one or more transistor amplifiers AMP. In the embodiment shown in FIG. 1, the electric circuit 12 includes three transistor amplifiers connected in series. The signal amplified by the transistor amplifiers AMP in the electric circuit 12 is output through a cable C2.

Specifically, voltage is applied between the electrodes with a dry battery having a voltage of 9V so that the powder detection device 10 can be used portably. In this state, the gap G between the copper plates 11 of the electrode unit 20 is filled with green sand that is powder having conductivity, so that the circuit is electrically closed in the electric circuit 12 to form a closed circuit. The voltage of the transistor amplifiers AMP thus drops, and the voltage is output through the cable C2. The powder is detected by measuring a signal value output from the cable C2. Here, although detection sensitivity to powder is better with more stages of transistor amplifiers AMP (the number connected in series), the electric circuit 12 of three stages can detect with adequate sensitivity in the case where green sand is detected with the electrode unit 20 used here. The degree of voltage drop, which depends on the property of powder, can be adjusted in the inside of the electric circuit 12.

EXAMPLE 1

An example of the present invention will be described with reference to FIG. 2 to FIG. 5.

Figure 2:
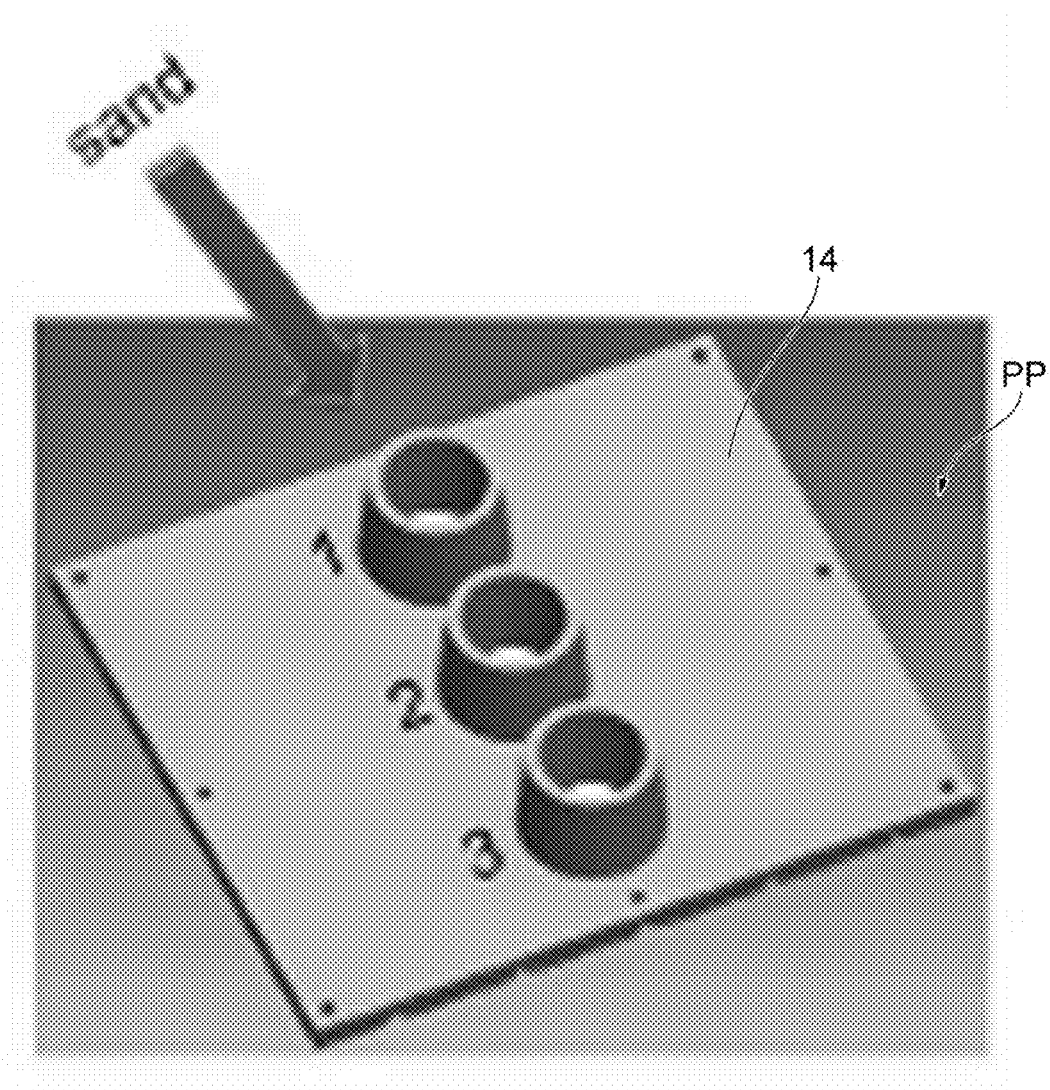
FIG. 2 is a schematic diagram of a pattern plate for making a green sand mold.

FIG. 2 shows a test pattern plate PP as a model for green sand molding, in which three sleeves 1, 2, and 3 are bolted with a 160-mm spacing in the middle of a flat plate 14 of 508 mm×610 mm. To make a green sand mold, a flask having a height of 260 mm is set with the flat plate set vertically such that the sleeves 1, 2, and 3 are arranged in this order from the top, with the sleeve holes oriented horizontally. In this state, green sand is blown in from above using an aeration squeeze molding device, used in practice, and thereafter mechanically squeezed with a plate parallel to the flat plate 14 of the pattern plate PP.

The front ends of the sleeves each have an outer diameter of 80 mm and an inner diameter of 70 mm with a draft angle of 0.5 degrees. The sleeves have three kinds of heights, namely, 70, 90, and 110 mm.

Figure 3:
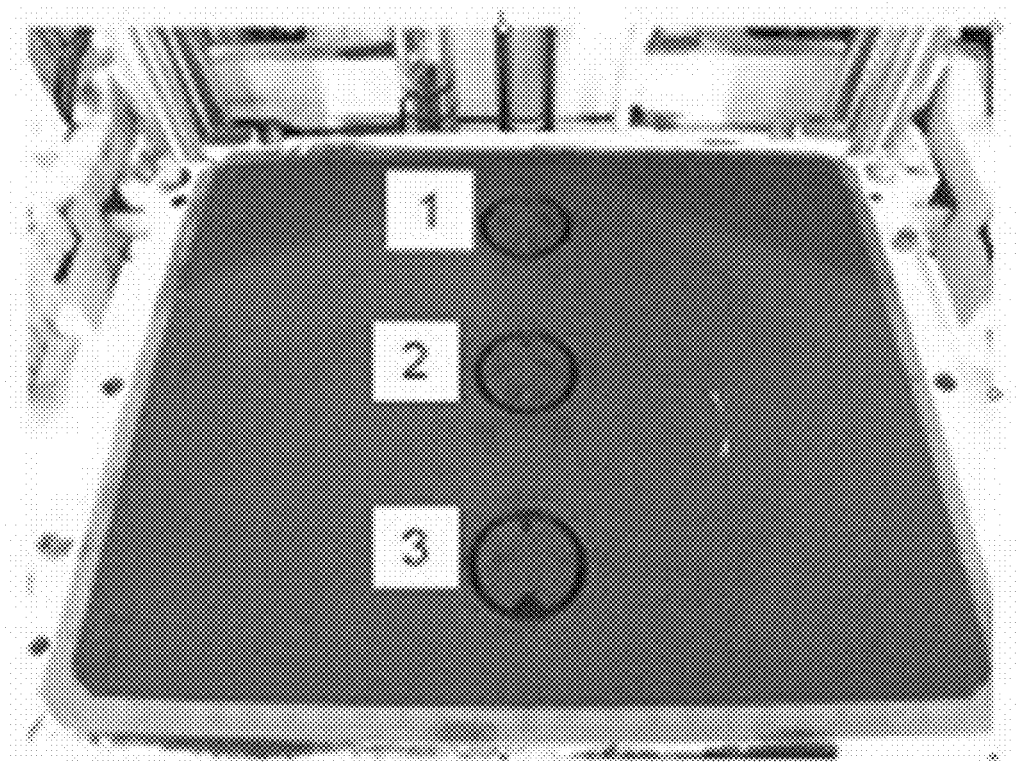
FIG. 3 is a diagram showing a green sand mold made by the pattern plate in FIG. 2.

In this Example, a pair of copper plates 11 of the electrode unit 20 are buried at the bottom of all of the three sleeves, which are aeration-filled with molding green sand adjusted at CB35 with compressed air of a low pressure of 0.1 MPa, followed by squeeze at a pressure of 0.8 MPa to complete green sand molding. As shown in FIG. 3, the produced green sand mold has the shape of the inverted pattern plate PP and therefore has concave cylindrical cavities therein.

Figure 4:
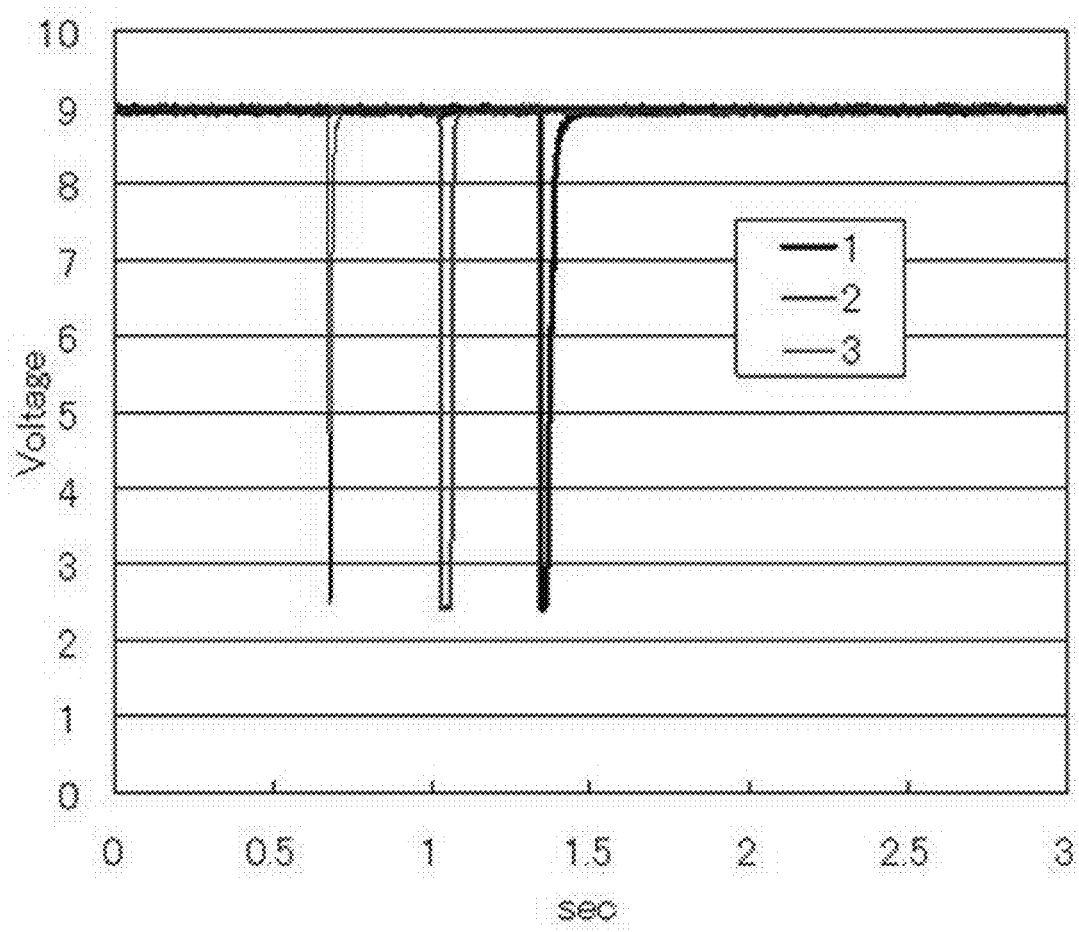
FIG. 4 is a graph of sand detection measured in a sand filling process.

FIG. 4 shows an example of a detection signal during green sand aeration filling. In a state in which the gap G between the electrodes is not filled with green sand, the voltage reads 9 V and drops at the instant when the gap G between the electrodes is filled with green sand. In this example, green sand is blown in from above to fill the sleeve 3 at the lowest position most quickly. The green sand arrival time then is about 0.7 seconds. The sleeves at the upper position are successively filled with sand. The reason why voltage returns to 9 V immediately after the electrodes are filled with green sand is that green sand stops moving and therefore the contact between the electrodes and green sand becomes weak. Accordingly, when green sand is squeezed after the pattern plate PP is filled with green sand, green sand and the electrodes come into intimate contact again, so that the voltage detected in the transistor amplifiers AMP decreases again.

Figure 5:
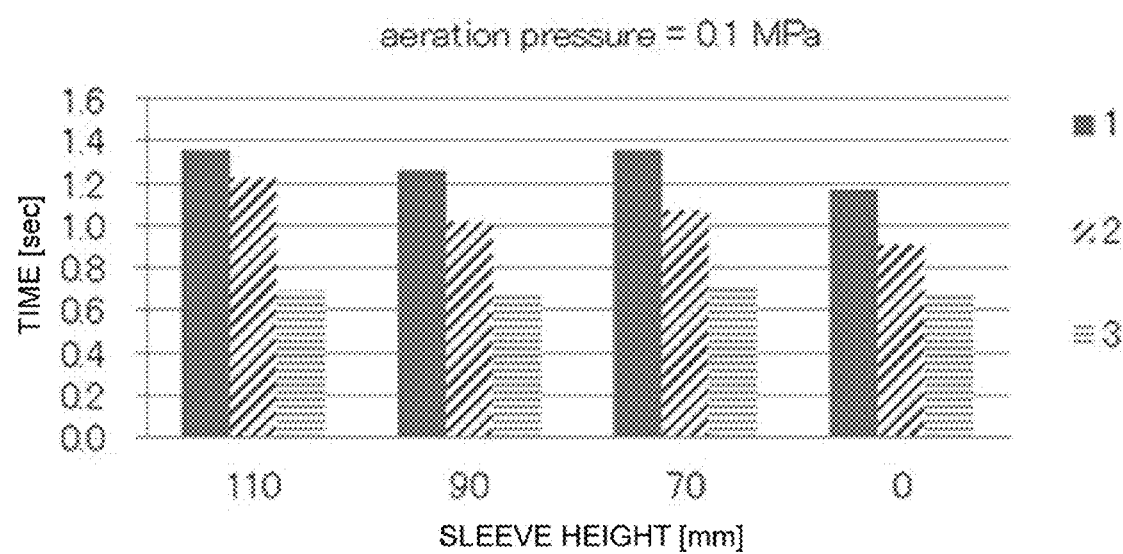
FIG. 5 is a graph showing sand arrival times at each sleeve length.

FIG. 5 is a graph showing the arrival time of green sand in the sleeves. The abscissa shows sleeve heights, and the sleeve height "0" is a molding condition with a flat pattern plate PP without sleeves. This graph indicates that the effect of sleeve heights on the sand filling time is extremely small. This is presumably because green sand is fluidized by aeration filling and green sand flows as if liquid flows to fill the inside of the sleeves.

As described above, in the present invention, electrodes are mounted at a desired position to enable instantaneous detection of arrival of green sand in the green sand filling process. Therefore, a green sand filling defect at a location where a voltage drop is not detected can be determined, and the completion of sand filling can be determined precisely, thereby shortening the molding cycle.

The present invention can be applied in a variety of usage using sand, other than green sand molding, including mold/core making in connection with filling with molding sand for use in sand mold casting, such as thermosetting, gas hardening and self-hardening sands, detection of the presence or absence of sand in a sand tank, and detection of blockage of sand in a sand transportation process.

REFERENCE SIGNS LIST

10 . . . powder detection device, 11 . . . copper plate, 12 . . . electric circuit, 14 . . . flat plate, 20 . . . electrode unit, 22 . . . insulating base, C1, C2 . . . cable, G . . . gap, PP . . . pattern plate.

The invention claimed is:

1. A method for detecting powder using a powder detection device including a pair of electrodes arranged to be opposed to each other with a gap interposed therebetween, a power source configured to apply a direct voltage between the pair of electrodes and an electric circuit electrically connected to the pair of electrodes, the method comprising:
   detecting powder filling based on a voltage drop of the direct voltage applied between the pair of electrodes resulting from the electric circuit forming a closed circuit, together with powder and the pair of electrodes, when the powder fills the gap.

2. The method for detecting powder according to claim 1, wherein
   the electric circuit includes at least three transistor amplifiers connected in series.

3. The method for detecting powder according to claim 2, wherein the electrodes are formed of elongated metal plates and have a length of 50 mm or less in the longitudinal direction of the electrodes.

4. The method for detecting powder according to claim 2, wherein
the powder is molding sand for use in sand mold casting.

5. The method for detecting powder according to claim 1, wherein
the electrodes are formed of elongated metal plates and have a length of 50 mm or less in the longitudinal direction.

6. The method for detecting powder according to claim 5, wherein
the powder is molding sand for use in sand mold casting.

7. The method for detecting powder according to claim 1, wherein
the powder is molding sand for use in sand mold casting.

8. The method for detecting powder according to claim 1, wherein the power source is a dry battery.

9. A powder detection device comprising:
a pair of electrodes arranged to be opposed to each other with a gap interposed therebetween;
a power source configured to apply a direct voltage between the pair of electrodes; and
an electric circuit electrically connected to the pair of electrodes, wherein
the powder detection device detects powder filling based on a voltage drop of the direct voltage applied between the pair of electrodes resulting from the electric circuit forming a closed circuit, together with powder and the pair of electrodes, when the powder fills the gap.

10. The powder detection device according to claim 9, wherein
the electric circuit includes at least three transistor amplifiers connected in series.

11. The powder detection device according to claim 10, wherein
the electrodes are formed of elongated metal plates and have a length of 50 mm or less in the longitudinal direction of the electrodes.

12. The powder detection device according to according to claim 10, wherein
the powder is molding sand for use in sand mold casting.

13. The powder detection device according to claim 9, wherein
the electrodes are formed of elongated metal plates and have a length of 50 mm or less in the longitudinal direction of the electrodes.

14. The powder detection device according to according to claim 13, wherein
the powder is molding sand for use in sand mold casting.

15. The powder detection device according to according to claim 9, wherein
the powder is molding sand for use in sand mold casting.

16. The powder detection device according to claim 9, wherein the power source is a dry battery.

* * * * *